United States Patent
Mosler

(10) Patent No.: US 6,811,170 B2
(45) Date of Patent: Nov. 2, 2004

(54) LEAF SPRING REAR AXLE VEHICLE SUSPENSION

(75) Inventor: Christian Mosler, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 15 days.

(21) Appl. No.: 10/254,070

(22) Filed: Sep. 24, 2002

(65) Prior Publication Data

US 2003/0098565 A1 May 29, 2003

(30) Foreign Application Priority Data

Nov. 24, 2001 (DE) .......................................... 101 57 712

(51) Int. Cl.[7] .......................... B60G 11/04; B60G 11/12
(52) U.S. Cl. ........................ 280/124.176; 280/124.175; 267/270; 267/271; 267/269; 267/141.2
(58) Field of Search ................... 280/124.175, 124.176; 267/269, 270, 271, 141.2

(56) References Cited

U.S. PATENT DOCUMENTS

| | | | | |
|---|---|---|---|---|
| 3,250,546 A | * | 5/1966 | Allison ................ | 280/124.176 |
| 3,924,873 A | | 12/1975 | Crouch | |
| 4,004,826 A | * | 1/1977 | Subhedar ............. | 280/124.176 |
| 4,061,364 A | * | 12/1977 | Parks ................... | 280/124.176 |
| 5,328,159 A | * | 7/1994 | Kaufman et al. ............. | 267/52 |
| 6,079,723 A | | 6/2000 | Choi | |

FOREIGN PATENT DOCUMENTS

| | | |
|---|---|---|
| DE | 1 780 209 | 1/1972 |
| DE | 36 37 663 | 5/1987 |
| DE | 40 42 204 | 5/1992 |
| DE | 44 01 776 | 8/1995 |
| EP | 0 493 731 | 7/1992 |
| FR | 2 717 236 | 9/1905 |
| FR | 2 520 072 | 7/1983 |
| FR | 2 564 782 | 5/1984 |
| GB | 2 008 714 | 6/1979 |
| GB | 2 033 533 | 5/1980 |
| GB | 2 211 473 | 7/1989 |
| JP | 8-268023 A | * 10/1996 |

OTHER PUBLICATIONS

Jömsen Reimpell, Fahrwerkstechnik 1, Vogel–Verlag, Würzburg, 1970 p. 100.

* cited by examiner

Primary Examiner—Ruth Ilan
(74) Attorney, Agent, or Firm—Klaus J. Bach

(57) ABSTRACT

In a leaf spring suspension for a rear vehicle axle including a rigid axle body, wherein the suspension comprises leaf springs extending in the longitudinal direction of the vehicle at opposite sides of the vehicle and the leaf springs have front and rear end supports by way of which they are mounted to the vehicle body, the rear supports for supporting the springs on the vehicle body in a longitudinally displaceable manner are stiff in a transverse direction and the front supports are resilient in a transverse direction such that, when the vehicle is subjected to side forces, a pivot pole is established for the rear axle, which is disposed behind the center of the rear axle.

11 Claims, 2 Drawing Sheets

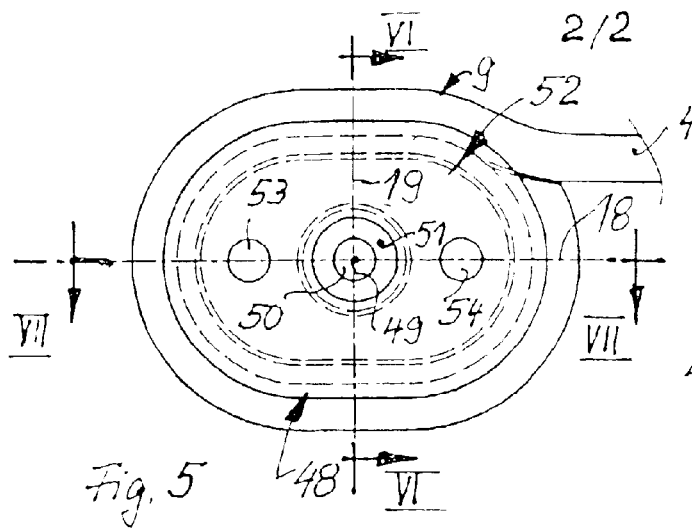
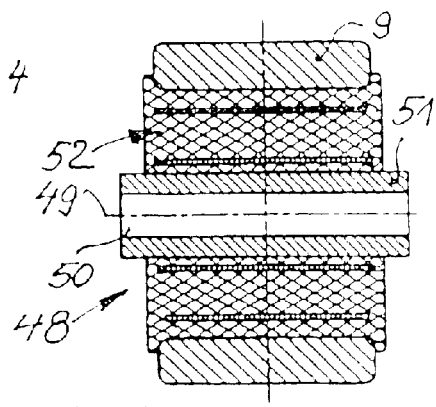
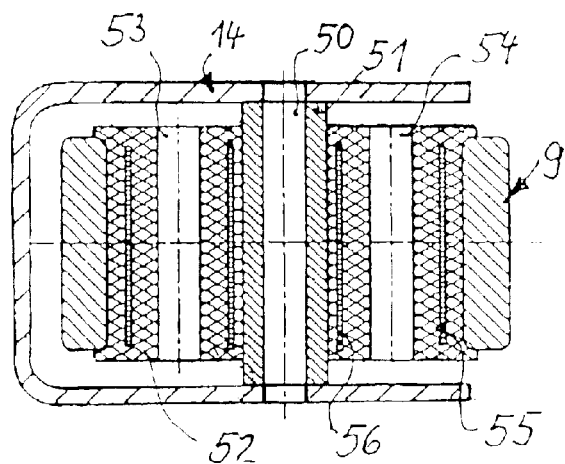
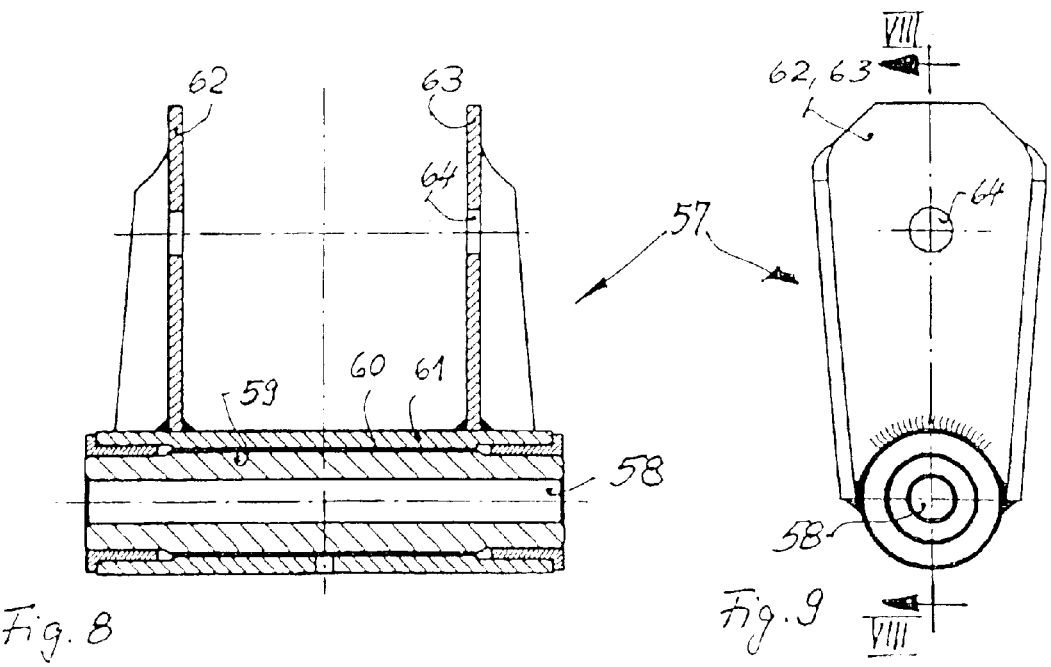
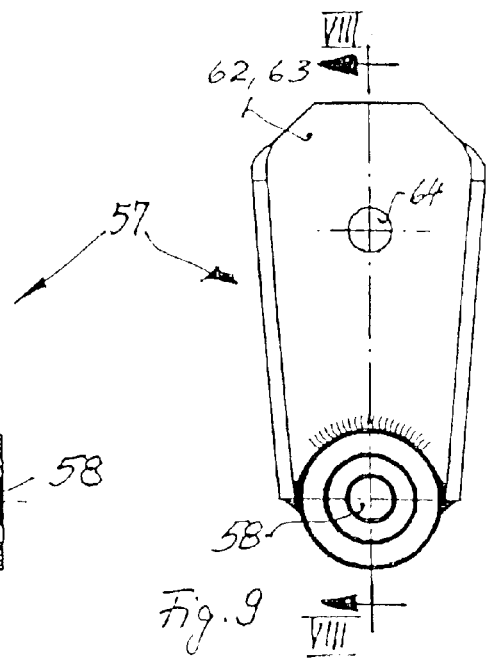

LEAF SPRING REAR AXLE VEHICLE SUSPENSION

BACKGROUND OF THE INVENTION

The invention relates to a leaf-spring rear axle vehicle suspension, particularly for light commercial vehicles which have a rigid rear axle body provided with longitudinally extending leaf springs with eyelets formed at their front ends by way of which they are mounted to a vehicle body via elastic sleeves and which are supported at their rear ends by a support structure permitting longitudinal movement of the rear ends of the leaf springs.

Rear axle suspension of the above type are known, for example, from the book by Jörnsen Reimpell, Fahrwerkstechnik 1, Vogel-Verlag, Würzburg, 1970, page 100. With respect to an understeer behavior when negotiating curves, the rear axle body is guided by longitudinally extending leaf springs which are arranged at opposite ends of the axle body and hinged to the vehicle body and which extend from a rear hinge location forwardly in a downwardly inclined manner. In this way, the different spring travels—spring compression at the outer axle (with respect to the curve) and spring release at the inner axle can be converted to longitudinal movements of the axle body such that the axle body is moved forwardly at curve-outer axle end and rearwardly at the inner axle end. In this way, a position of the axle is obtained in which it is inclined with respect to the vehicle travel direction so that the rear axle steers inwardly into the curve, which results in an understeering vehicle behavior. Such an operation depends on the movements of the vehicle body which is why such a steering behavior is called roll steering which, because of its dependency on the vehicle body movements is relatively slow and which, particularly with other non-symmetric spring movements provides for undesirable steering effects. Furthermore, the design conditions must permit such a mounting of the leaf springs at different front and rear height levels or the vehicle design must be adapted and this may affect other vehicle design features.

The elastic bearings to be disposed in the eyelet support structures of the longitudinal leaf springs comprise generally elastic bearing sleeves which include inner and outer sleeve members and which are inserted, or pressed, into the spring eyelet. With regard to an acoustic uncoupling, the sleeves are, with an exact axle guide structure, generally radially relatively soft and axially, that is, in the transverse vehicle direction, relatively stiff. (DE 40 42 201 C1).

For achieving side force-dependent understeer effects, it is known, for example, from DE OS 178 0209, to mount or anchor the wheel support members with regard to the vehicle body by way of a common axle carrier which is often also called an equalizing truck and to attach the wheel support member to the axle carrier by way of elastic elements. These elastic elements are so formed and/or arranged that, with respect to side forces, tilt or roll movements occur about a pivot pole which is disposed behind the center of the axle. With regard to comfort, but also with regard to an improved force transfer to the vehicle body and/or a better positioning of the attachment of the wheel guide members to the vehicle body such solutions are often found to be expedient but they require additional expenses.

It is therefore the object of the present invention to provide a leaf-spring rear axle suspension for vehicles, particularly for light commercial vehicles, with which the advantages of present designs particularly their economical advantages with regard to a side force-depending understeer behavior are maintained but to improve the operating behavior and handling of such vehicles.

SUMMARY OF THE INVENTION

In a leaf spring suspension for a rear vehicle axle including a rigid axle body, wherein the suspension comprises leaf springs extending in the longitudinal direction of the vehicle at opposite sides of the vehicle and the leaf springs have front and rear end supports by way of which they are mounted to the vehicle body, the rear supports for supporting the springs on the vehicle body in a longitudinally displaceable manner are stiff in a transverse direction and the front supports are resilient in a transverse direction such that, when the vehicle is subjected to side forces, a pivot pole is established for the rear axle which is disposed behind the center of the rear axle.

With the sidewardly soft support for the front end of the leaf springs and a stiff sideward support of the rear support of the leaf spring a roll center is formed when side forces are effective on the vehicle body, that is a pivot pole is established by the wheel suspension, which pivot pole is behind the center of the axle. In this way, the longitudinal leaf springs can pivot slightly about the rear supports of the vehicle body on the springs, like with a parallel arm suspension, so that, depending on the respective curve direction that is depending on the side forces resulting therefrom, the axle body is slightly inclined with respect to the longitudinal vehicle direction so as to provide for understeering of the vehicle when negotiating a curve.

The solution according to the invention does not require any changes of the proven design concept of leaf spring rear axle suspensions for driven or non-driven axles and may be particularly advantageously utilized in connection with light commercial vehicles. The invention can be expediently realized in connection with conventional leaf spring designs without the need for any design changes and without the need for changing the leaf springs.

With respect to the desired comfort-improving suspension and the desired understeer characteristics, a design is particularly expedient, wherein, with a spring eyelet of oval shape, whose greater axis extends in the longitudinal direction of the spring, a structure with an elastic movability normal to a line inclined to a transverse vehicle direction and extending essentially through the pivot pole relative to the respective support console and which provides for an elasticity in a vertical direction, is provided. The elastic sleeves of the bearings have essentially the same thickness so that also the size requirements are the same as in comparable conventional designs. To this end, it is expedient, if the elastic sleeves are slightly oval corresponding to the spring eyelet, wherein the axis of the sleeve is inclined with respect to the axis of the spring eyelet. The inner sleeve area is formed by a bearing core in the form of a cylinder which is inclined with respect to the sleeve, notwithstanding the sleeve opening being parallel to the axis of the spring eyelet, which sleeve opening forms the reception bore for a mounting bolt. The reception bore is disposed in the area of front projections, which extend beyond the side stops of the bearing. The projections form the side support with respect to the support console, so that proper assembly is ensured by fitting projections and recesses during assembly.

The outer sleeve of the bearing is, corresponding to the contour of the eye of the spring, an annular body of oval cross-section with annular walls, which extend parallel to the bearing axis, which coincides with the eyelet axis. As a result, the inner sleeve, whose axis extends at an angle to the eye and bearing axis, forms in a transverse cross-sectional view, wedge shaped and circumferentially sickel-shaped spaces between the outer and the inner sleeves, which spaces at the opposite sides of the inner sleeve are oriented in opposite directions and are filled with inserts. The inserts are guide means and are therefore expediently of a hard material. They may be formed by in situ injection molded structures attached to the outer sleeve. The arrangement provides for understeer effects, which are obtained thereby with little expense. The arrangement can be provided inexpensively by only minor modifications of the conventional bearing structures in the eyelets of the leaf springs. The springs themselves are not modified and may be used in connection with other bearing designs for similar vehicles.

Comparable effects can be reached in accordance with the invention with the bearings for the front supports of the two longitudinal leaf springs of a suspension mounted in the eyelets of the springs in the same manner, if the bearings of the front supports of the two longitudinal leaf springs are, particulary with the axes of the bearing sleeves aligned, supported with a certain longitudinal resiliency, in addition to the transverse resiliency, which longitudinal resiliency however is substantially less than the transverse resiliency the resiliency in the transverse direction being 2 to 3 times the resiliency in the longitudinal direction of the vehicle. The soft support in transverse direction provides over a small range around the neutral design position a support without distance-dependent hardening, but then becomes progressively stiffer. This permits in connection with the, in transverse direction, rigid rear supports a transverse displacement of the rear axle suspension in the area of the front supports of the leaf springs which causes the pivot pole of the suspension to be placed behind the center of the axle and results in comfortable longitudinal spring characteristics. Longitudinal vibrations can be prevented in accordance with a particular embodiment of the invention by dampening the rear support in respect to longitudinal movements. This can be achieved in a simple manner by a dampening slide bearing mount of the rear spring support, for example by way of compensation shackles, which are supported on the body in a dry sliding manner.

Such a construction of the rear axle suspension is possible in connection with oval as well as round bearings. With the appropriate hollow spaces in the elastic bearing sleeves, the desired rigidity can be obtained in a simple manner without other design features.

Various embodiments and features of the invention will be described below in greater detail on the basis of the accompanying drawings.

BRIEF DESCRIPTION OF THE DRAWINGS

FIGS. 8 and 9 shows a rear support for the longitudinal leaf springs with spring compensation shackles for the support of the longitudinal leaf springs on the vehicle body.

DESCRIPTION OF PREFERRED EMBODIMENTS

Figure 1:
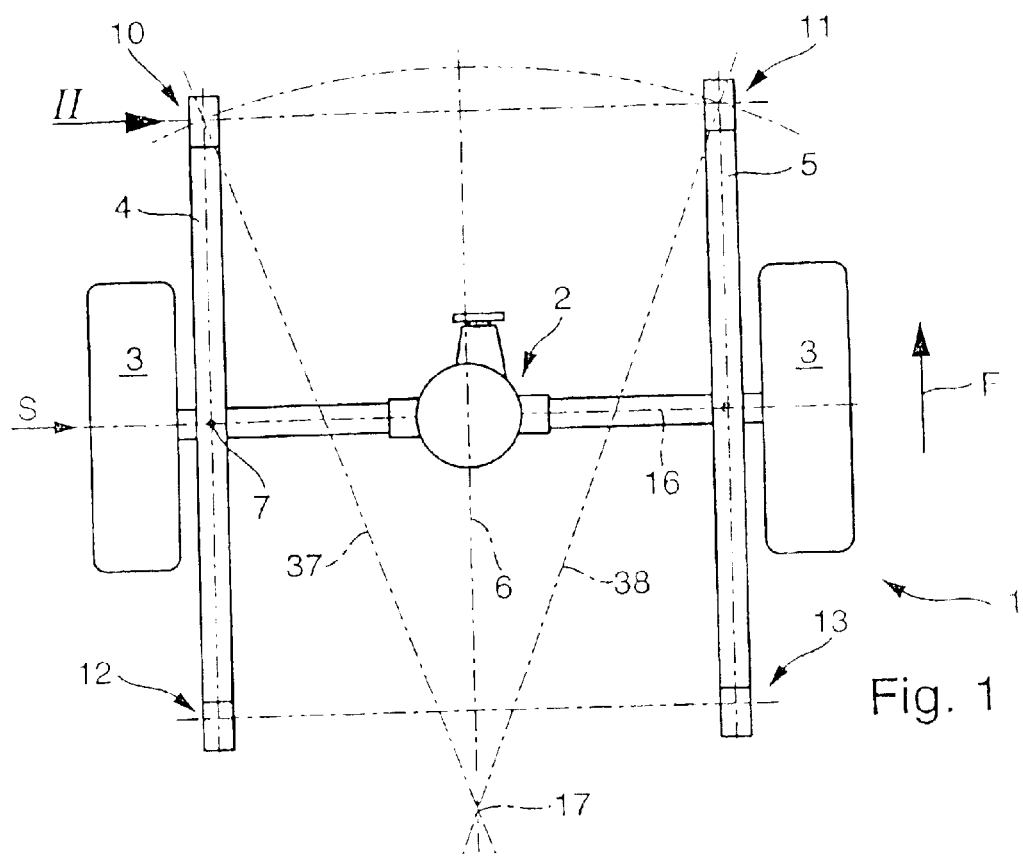
FIG. 1 shows schematically a leaf-spring suspension for a rear axle with an understeer function according to the invention.

FIG. 1 shows schematically a leaf spring rear axle suspension of a vehicle, which is not shown.

The forward travel direction of the vehicle is indicated by the arrow F. The wheels 3 of the rear axle 2 are the drive wheels. Such a rear axle suspension 1 is particularly suitable for light commercial vehicles such as delivery vans. The axle body 2 is guided by way of the leaf springs 4 and 5. They extend at opposite sides of the longitudinal center plane 6 of the vehicle closely adjacent the wheels 3 in the longitudinal direction of the vehicle and are connected to the axle body in a conventional manner, which is not shown herein. The connections are only indicated schematically at 7.

Figure 2:
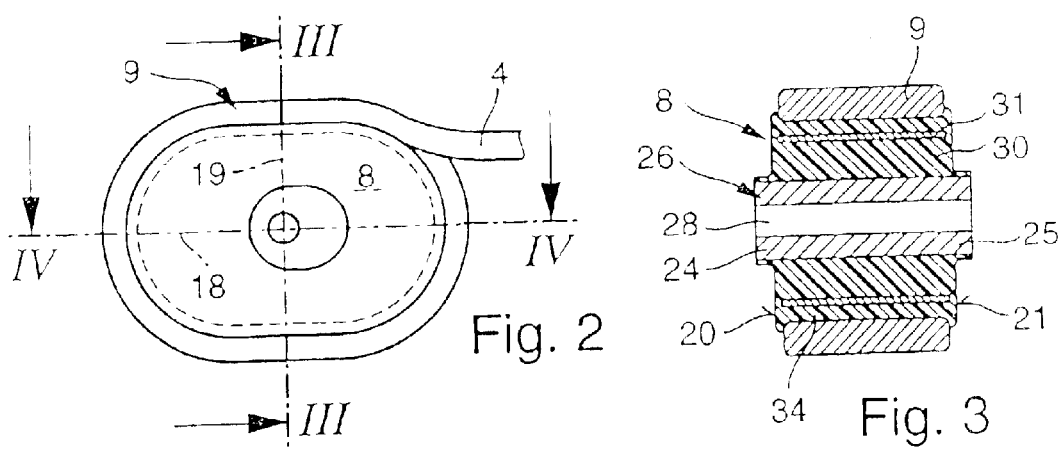
FIG. 2 shows, in the direction of arrow II of FIG. 1, the spring eyelet area of the left side leaf spring of FIG. 1 with an elastic bearing disposed therein.
Figure 3:
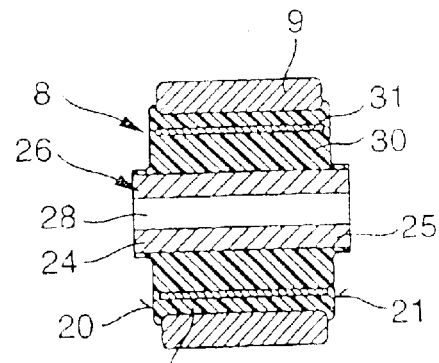
FIG. 3 is a cross-sectional view taken along line III—III of FIG. 2.
Figure 4:
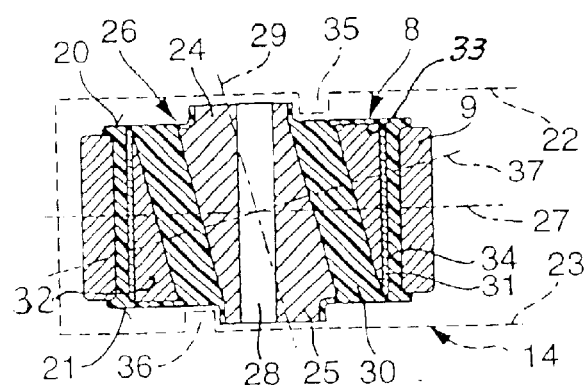
FIG. 4 is a cross-sectional view taken along line IV—IV of FIG. 2, FIGS. 5 to 7 are cross-sectional views corresponding to FIGS. 2 to 4 of the eyelet of the left leaf spring with elastic bearings disposed in the eyelets.

Preferably, the leaf springs 4, 5 are mounted to the vehicle axle by way of the elastic bearings 8 according to FIGS. 2–4 in a non-slidable but rotationally resilient manner. However, within the scope of the invention is also a rotationally non-resilient or almost rigid connection between the leaf springs 4, 8 and the vehicle axle. If the elastic bearings 48 are according to FIGS. 5 to 7, a longitudinally non-displaceable but rotationally resilient bearing support is preferred.

Also, the mounting of the leaf springs 4, 5 on the frame or body of the vehicle is essentially conventional. With respect to the driving direction F, for the front connections or supports 10, 11 elastic bearings 4, 6 or, respectively, 48, as they are shown in FIGS. 2 to 4 or, respectively, FIGS. 5 to 7 may be used and for the rear suspensions 12, 13 depending shackles may be used which accommodate longitudinal movements of the rear ends of the springs.

The elastic bearings 8 or, respectively, 48 according to FIGS. 2 to 4 and FIGS. 5 to 7 are connected to the front end of the leaf springs 4, 5 in that the ends of the leaf springs are bent around to form eyelets 9 (FIG. 2, 5) into which the elastic bearings 8 are inserted. At the side of the vehicle body, consoles 14 are provided as indicated in FIGS. 4, 7, with respect to which the elastic bearings 8, 48 are mounted by mounting bolts which are not shown, but which extend through the elastic bearings 8, 48 inserted into the spring eyelets 9.

The elastic bearings 8 according to the invention which will be described below in greater detail on the basis of FIGS. 2 to 4 are arranged in the spring eyelets 9 of the leaf springs 4 and 5 in a mirror-reversed manner with respect to the longitudinal center plane 6. They are functionally so constructed that they are elastic in a direction transverse to the travel direction of the vehicle. The transverse movability determined by the elasticity is such that, under the influence of side forces S—when negotiating curves—a side force dependent understeer behavior is obtained. To this end, the elastic bearings 8 are, with respect to their elasticity, so designed that a pivot pole 17 behind the center of the axle 16 is established. Side forces S as they are indicated in FIG. 1 for a right turn, result with the arrangement shown—again on the basis of FIG. 1—in a pivoting of the leaf springs 4, 5 about the pivot pole 17 in the direction of the curve. As a result, the axle body 2 is moved to a slightly inclined position wherein the curve-outer wheel 3 is moved to a slight toe-in position and the curve-inner wheel to a slight toe-out position providing for an understeer effect.

The elastically supported transverse movability made possible by the elastic bearing 8 is expedient since it also provides for an acoustic uncoupling of the rear axle suspension 1 with respect to the vehicle body and since no noticeable expenses are necessary over the conventional rear axle suspension.

FIG. 2 shows a side view of a spring eyelet 9 with an elastic bearing 8 disposed herein. The leaf spring 4, whose end is rolled in to form the eyelet 9, is not further shown. The spring eyelet 9 is formed in accordance with a preferred embodiment as a longitudinally extending oval with a long axis 18 oriented in the direction of the leaf spring 4, and the short axis 19 normal thereto in a vertical direction. In its width, that is normal to the vertical plane defined by the axes 18 and 19, the spring eyelet 9 corresponds about to the width of the leaf spring 4, and the elastic bearing fills the spring eyelet 9. In this way, with little sideward overlap by the elastic bearing, flat sideward end surfaces 20 and 21 are formed which extend preferably parallel to the side walls 22 and 23 of the console 14 indicated by dashed lines. The elastic bearing 8 has a bearing core 26 with projections 24 and 25, which engage the side walls 22 and 23 of the console 14. The face and support surfaces of the projections 24 and 25 extend parallel to each other and also parallel to the plane defined by the axes 18 and 19. This plane is indicated in FIG. 4 by the reference numeral 27. A bore 28 extends through the bearing core 26 for the reception of a mounting bolt which is not shown but by which the bearing core 26 is held in engagement with the side walls 22 and 23 of the console 14.

The bearing core 26 has the shape of a slanted cylinder whose cylinder axis 29 is inclined in the sectional plane IV-IV including the long axis 18 as shown in FIG. 2 with respect to the axis of the bore 28. The angle of inclination is, in the embodiment as shown in FIG. 1, wherein the cylinder axis 29 extends normal to the respective pole line 37, 38, in the size range of 15°. The lines extending from the pivot pole 17 to the supports 10, 11 and the respective bearings 8 are indicated by the numerals 37 and 38.

The bearing core 26 forms the inner sleeve of the elastic bearing 9 which is surrounded by a ring 30 of elastic material which is delimited by the outer sleeve of the elastic bearing 9. The outer sleeve comprises an annular body 31, which follows the contour of the ring eyelet 9. Because of the inclined position of the bearing core 26 and the inner sleeve formed hereby and with the elastic ring 30 having a constant thickness over its circumference, in the direction of the long axis 18, opposite wall sections form in a circumferential direction sickle-shaped openings which are triangular in cross-section. These openings are filled with inserts 32, 33 in adaptation to the contour of the inner and outer sleeves. The inserts 32, 33 are preferably plastic material wedges formed by injection molding and, as shown in FIG. 4 are oriented in opposite directions. As apparent from FIGS. 3 and 4, the annular body 31 is provided at its outer side with an elastic support ring 34 so that the ring 30 and the support ring 34 are joined during injection molding of the elastic bearing 8. The elastic bearing 8 may also be fixed in the spring eyelet 9 by way of the support ring 34 by pressing the structure into the eyelet 9.

The position of the bearing core 26 inclined with respect to the bore 28 and with the annular body 31 of the outer sleeve extending in the same direction causes the projections 24, 25 and also the inserts 32, 33 to be arranged displaced with respect to each other in the longitudinal direction of the leaf spring eyelet. This is utilized in accordance with the invention in an expedient manner to ensure that support parts of the side walls 22, 23 of the console 14, particularly projections 35, 36 engage the side surfaces 20, 21 of the elastic bearing 8 or the leaf spring 4, 5 so that the leaf springs can be accommodated by the console and mounted thereon only when they are properly positioned.

In accordance with the symmetric displacement of the projections 24, 25 with respect to the bore 28 or, respectively, the axis of the leaf spring eyelet 9, which coincides with the axis of the bore 28, the elastic bearings 8 may be arranged in a mirror-reversed fashion in the respective spring eyelets of the leaf springs 4 and 8, respectively, so that a bearing of the same type can be used for both longitudinal leaf springs 4, 5.

In FIGS. 5 to 7 for corresponding parts of the supports 10 and 11 the same reference numerals are used as in FIGS. 2 to 4. In connection with the bearings of FIGS. 5 to 7, functional effects can be achieved, which, to a large extend, are corresponding to those achieved by the rear axle suspension shown in FIGS. 2 to 4. Consequently, for those effects, reference is made to the above description. The following description is limited to the different design features.

The bearing 48 has a bearing axis 49, which extends in the same direction as, or is coincident with, the axis of the spring eyelet 9 and the axis of the bore 50 of the bearing core 51 which is in the form of a rigid sleeve. The bearing core 51 is surrounded by an elastic sleeve member 52, which, in adaptation to the eyelet 9, has an oval shape. The embodiment described on the basis of FIGS. 5 to 7 however is usable also in connection with circular cylindrical bearing eyelets and correspondingly circular sleeve members 52.

The sleeve members 52 of oval cross-section as shown in FIGS. 5 to 7 include, in the direction of the long axis 18, opposite recesses 53 and 54, which are shown as bores. The elastic sleeve members 52 further include, adjacent the surrounding eyelet 9 and adjacent the bearing core 51, rigid inserts 55 and 56, particularly of a metallic material, of which the inner insert 56 has preferably a greater axial length than the outer insert 55.

With respect to their elasticity, the bearings 48 are so designed that their longitudinal stiffness, that is, the stiffness in the direction in which the leaf springs 4 and 5 extend, is about three to four times greater than their transverse stiffness. The resiliency in the transverse direction is achieved by means of the elastic sleeve members 52, which, under the influence of the side forces 5 effective in a curve, permit the transverse displacement of the bearing or spring eyelets 9 in the consoles 14. The transverse displacement under the influence of the side force occurs over a small distance of about +/−5 mm with a small almost flat linear transverse force increase. In the adjacent range, a highly progressive stiffening is provided so that, on one hand, with respect to the desired understeer effect the resiliency for forming the pivot pole is achieved and on the other hand sufficient transverse guiding is ensured when the side forces exceed a certain value. The pivot movement is limited preferably by a support of the sleeve member 52 with regard to the axis 49 outer side wall area on the console 14, wherein the sleeve member 52, with the shape of the inserts 55, 56, is preferably so constructed that its hardness in the transverse direction becomes smaller with increasing distance from the axis 49.

A relatively stiff support is preferably provided in the longitudinal direction for the accommodation of the acceleration and braking forces and for the attenuation of longitudinal vibrations.

With regard to the establishment of the pivot pole and also the suppression of longitudinal vibrations, a design for the rear supports 12 and 13 as shown in FIGS. 8 and 9 is expedient. FIGS. 8 and 9 show the rear supports 12 and, respectively, 13 in the form of a compensation shackle 57 which is rigid in transverse direction and which is linked to the vehicle body in a transversely rigid manner. The rear ends of the springs 4, 5 are therefore linked to the vehicle body in a transversely stiff manner so as to achieve a rear transverse stability as it is needed for the establishment of the desired pivot pole, particularly with the bearing designs as shown in FIGS. 5 to 8.

FIG. 9 shows a compensation shackle 57; FIG. 8 shows the shackle in a cross-sectional view taken along line VIII—VIII of FIG. 9, wherein the compensation shackle 57 includes a dry slide bearing structure providing for friction in order to attenuate possible longitudinal vibrations. The compensation shackle 57 includes in the embodiment as shown in FIGS. 8 and 9, a lower bearing structure by way of which it is supported on the vehicle body by a bolt (not shown) extending through the bore 58 of the sleeve member 59. The sleeve member 59 is provided with a dry friction bearing structure 60, which is disposed in a support sleeve 61 against which it operates with a relatively large friction. The support sleeve 61 is mounted to the shackle arms 62, 63, which include bores 64 for receiving bolts (not shown) for mounting a rear leaf spring bearing which is not shown herein but which is preferably also in the form of an elastic bearing.

What is claimed is:

1. A leaf spring suspension for a rear vehicle axle including a rigid rear axle body providing for understeer characteristics of the vehicle, said suspension comprising leaf springs extending in the longitudinal vehicle direction at opposite sides of a longitudinal vehicle center plane, said leaf springs having front and rear end supports by way of which said leaf springs are mounted to a vehicle body, at least the front end supports of said springs having eyelets and bearings received in said eyelets and bolts extending in a transverse vehicle direction through said bearings for mounting said springs to said vehicle body, said rear end supports supporting said springs on said vehicle body in a longitudinally displaceable manner, said front end supports being resilient in a transverse vehicle direction and said rear end supports being stiff in a transverse vehicle direction such that, when said vehicle is subjected to side forces when negotiating curves, a pivot pole is established for said axle by the elastic front and stiff rear end supports of said leaf spring suspension which is behind the center of said rear axle, said bearings in the eyelets of the front ends of said leaf springs including radially spaced inner and outer sleeves with a cylindrical elastic body disposed therebetween, said inner and outer sleeves receiving said cylindrical elastic body having a shape so as to define the annular space for retaining said elastic body at an inclination with respect to a line normal to a pole line extending from said pivot pole to said front leaf supports.

2. A leaf spring suspension according to claim 1, wherein said pivot pole is disposed centrally behind said axle in the area of the rear end spring supports.

3. A leaf spring suspension according to claim 1, wherein said pivot pole is disposed in an area behind the rear end spring supports.

4. A leaf spring suspension according to claim 1, wherein said resilient bearing includes an annular member corresponding to the shape of the spring eyelet and wedge shaped support members which are disposed between said annular member and said cylindrical elastic body so as to provide a contour for said outer sleeve corresponding to that of said inner sleeve, said wedge-shaped support members having a sickle-like shape in a radial cross-section of said bearing.

5. A leaf spring suspension according to claim 1, wherein said inner sleeve form as a bearing core having a transversely extending bore for receiving a bearing mounting bolt and including side projections which are displaced at opposite sides of the bearing in the direction of the long axis of said eyelet and in opposite directions and consoles are provided receiving said bearings and said spring eyelets and having inward projections disposed adjacent said side projections so as to permit installation of said elastic bearing in said consoles only in a proper position.

6. A leaf spring suspension according to claim 1, wherein said bearings received in the eyelets of said front end supports have aligned bearing axes and include resilient transverse and longitudinal support means wherein, however, the resiliency in the transverse direction is a multiple of that in the longitudinal direction.

7. A leaf spring suspension according to claim 6, wherein the resiliency in the transverse direction is 2 to 3 times the resiliency of the bearing in the longitudinal direction.

8. A leaf spring suspension according to claim 6, wherein said rear end supports include friction means for dampening movements of said leaf springs in the longitudinal direction of said vehicle.

9. A leaf spring suspension according to claim 8, wherein said rear end supports include compensation shackles, which provide for damping of the longitudinal movement of the rear end of said leaf springs.

10. A leaf spring suspension according to claim 9, wherein said compensation shackles are supported by way of a dry friction bearing.

11. A leaf spring suspension according to claim 1, wherein said leaf springs are mounted to said rear axle body in a firm and rigid manner.

\* \* \* \* \*